April 5, 1966     W. HAUSER-BUCHER     3,244,016
DRIVE SYSTEM FOR RECIPROCATING MEMBERS
Filed June 1, 1962     4 Sheets-Sheet 1

INVENTOR.
WALTER HAUSER-BUCHER

OSTROLENK, FABER, GERB, & SOFFEN
ATTORNEYS

April 5, 1966 W. HAUSER-BUCHER 3,244,016
DRIVE SYSTEM FOR RECIPROCATING MEMBERS
Filed June 1, 1962 4 Sheets-Sheet 2

INVENTOR.
WALTER HAUSER-BUCHER

OSTROLENK, FABER, GERB & SOFFEN
ATTORNEYS

April 5, 1966

W. HAUSER-BUCHER 3,244,016

DRIVE SYSTEM FOR RECIPROCATING MEMBERS

Filed June 1, 1962

INVENTOR.
WALTER HAUSER-BUCHER

OSTROLENK, FABER, GERB & SOFFEN
ATTORNEYS

April 5, 1966  W. HAUSER-BUCHER  3,244,016
DRIVE SYSTEM FOR RECIPROCATING MEMBERS
Filed June 1, 1962  4 Sheets-Sheet 4

INVENTOR.
WALTER HAUSER-BUCHER

OSTROLENK, FABER, GERB & SOFFEN
ATTORNEYS

United States Patent Office 3,244,016
Patented Apr. 5, 1966

3,244,016
DRIVE SYSTEM FOR RECIPROCATING MEMBERS
Walter Hauser-Bucher, Zurich, Switzerland, assignor to Bucher-Guyer A.-G. Maschinenfabrik, Niederweningen, Zurich, Switzerland
Filed June 1, 1962, Ser. No. 199,289
Claims priority, application Switzerland, June 5, 1961, 6,560/61
7 Claims. (Cl. 74—110)

It is known to make use of gyrating masses, as for example a fly-wheel, to assist in the driving of reciprocating elements, in order to provide a more uniform motion, and particularly in order to have inertia forces available for the reversal of a reciprocating element at its dead center positions. In the case of a rotating fly-wheel mass, however, the inertia forces are present not only in the dead center positions of the reciprocating element, but during other portions of its path of motion, which fact often is not only undesired but even detrimental. Thus, in the case of a mower, i.e. when driving a reciprocating cutter bar, these inertia forces can lead to serious damage when for example a stone or the like will be clamped between the cutters.

In view of these drawbacks, attempts have been made to drive reciprocating elements hydraulically, for instance by means of a hydraulic oscillatory drive mechanism. In such systems, any overload of the drive unit can be prevented by a simple overpressure safety device and the clamping of a stone between the cutters, as above mentioned, will not result in any damages in a hydraulically driven cutter unit. On the other hand, however, such a system does not provide the inertia forces in the dead center positions which are desired (and are often indispensable) for reversing the reciprocating motion of the cutters.

It is an object of the invention to provide a drive system for reciprocating an element in such a manner that the inertia forces resulting from a concurrently driven fly weight are principally operative only when they are actually desired and useful. According to the invention, the drive system comprises an oscillatory fly weight reciprocating with the same number of oscillations as the reciprocating element, said fly weight being operatively connected with the reciprocating element so that the fly weight and the element oscillate with a phase displacement. In a preferred construction the phase displacement amounts to ¼ period. In this manner the kinetic energy of the fly weight obtains its greatest possible value just when the reciprocating element is in the zone of the dead center position, while in the remaining path of motion of the element particularly intermediate its dead center positions, the value of the kinetic energy of the fly weight is below a value which could result in any detrimental effect, should the drive be obstructed.

In a particularly advantageous manner such a drive system may be used in connection with a tractor driven mower.

The present invention will now be described in more detail with reference to the accompanying drawings diagrammatically illustrating, by way of example, several embodiments of the invention, and in which.

Figure 1:
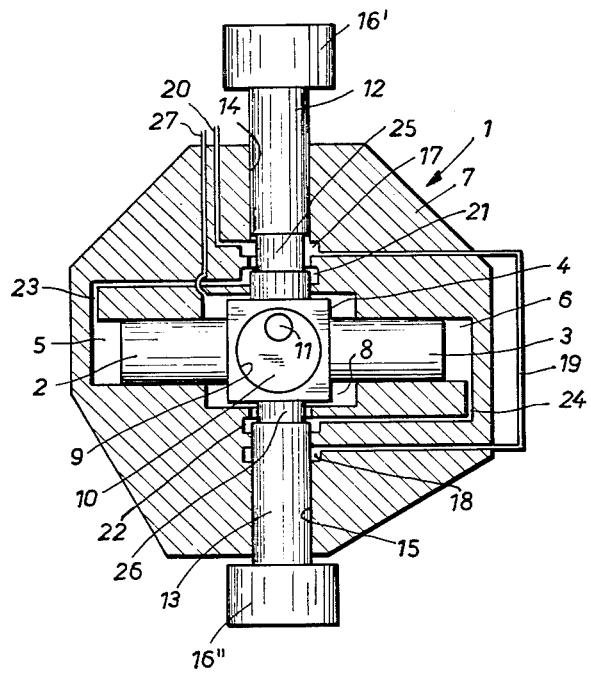
FIGURE 1 is a section through a hydraulic oscillating drive system having an opposed two-cylinder type engine.

The hydraulic oscillating drive system 1, shown in FIGURE 1, comprises two operating pistons 2 and 3 which are coaxially arranged with respect to each other and extend from a prismatic carrier 4 towards opposite sides. Operating pistons 2, 3 reciprocate in the cylinders 5 or 6 respectively of a housing 7. The carrier 4, which is situated in a central recess 8 of the housing 7, is provided with a circular recess 9 in which an eccentric disc 10 is rotatably mounted. An eccentric shaft 11 is in turn rotatably supported in the eccentric 10, and is connected with two oppositely extending identical cylindrical control slides 12, 13 which can reciprocate in coaxial bores 14 and 15, respectively, of the housing 1. The common axis of the pistons 2 and 3 is seen to form a right angle with the common axis of the control slides 12 and 13. Each slide 12 and 13 carries a weight 16' and 16", which cooperatively function synonymous to a single weight 16. The two weights 16' and 16" are secured to the ends of the slides projecting out of the housing 1.

The bores 14 and 15 are each provided with an annular space 17 and 18, respectively, communicating with each other by means of a duct 19, and with a pressure conduit 20. Additional annular spaces 21, 22 of the bores 14, 15 are connected by a conduit 23 or 24 to the cylinder 5 or 6. The control slides 12 and 13 are provided each with an annular space 25 or 26, which connect the interior annular space 21 or 22 of the housing bores 14, 15 alternately to the second annular space 17 or 18 of the particular bore, or to the recess 8 of the housing 1. The recess 8 communicates with a return conduit 27.

In the illustrated operative position of the oscillating drive 1, the piston 2 is shown in its pressure stroke and the piston 3 in its outlet stroke, the cylinder 5 being connected by the conduit 23 and the annular spaces 21, 25 and 17 to the pressure conduit 20, and the cylinder 6 is connected by the conduit 24, the annular spaces 22, 26 and the recess 8 to the return conduit 27. The carrier 4 according to FIGURE 1 is then displaced to the right hand side. At the same time, eccentric 10 rotates in a direction such that the two control slides 12 and 13 are downwardly moved until the annular space 26 interconnects the annular spaces 22 and 18. This serves to connect the cylinder 6 with the pressure conduit 20, while at the same time the cylinder 5 is connected by the annular space 25 to the recess 8 and thus to the return conduit 27. The movement of the carrier 4 and of the element which is to be reciprocally driven (not shown in FIGURE 1, but shown as a reciprocating cutter in the subsequently to be discussed embodiment of FIGURES 2–4) is reversed, with the movement of the reciprocating element being derived from the carrier. The reversal of the movement is assisted by the kinetic energy of the fly weights 16', 16", which energy will be at its maximum value at the moment of reversal. While the reciprocating element is at an intermediate portion of its path of travel, i.e. between the dead center positions of the pistons 2, 3, the kinetic energy of the fly weights drops to a harmless value. In fact, it may even assume a zero value in the dead center positions of the fly mass 16' (one such dead center position being shown in FIGURE 1). Thus the reciprocal movement of the element mainly is obtained by the action of the pressure medium, with this action being assisted by the kinetic energy of the fly weights only in the dead center positions of the element. When the reciprocating element strikes an obstacle at a portion of its travel intermediate the dead center positions, the over pressure safety device of the hydraulic system starts to function; that is, the hydraulic pressure drops and the then present kinetic energy of the fly weights by itself can no longer have any detrimental effect.

Figure 2:
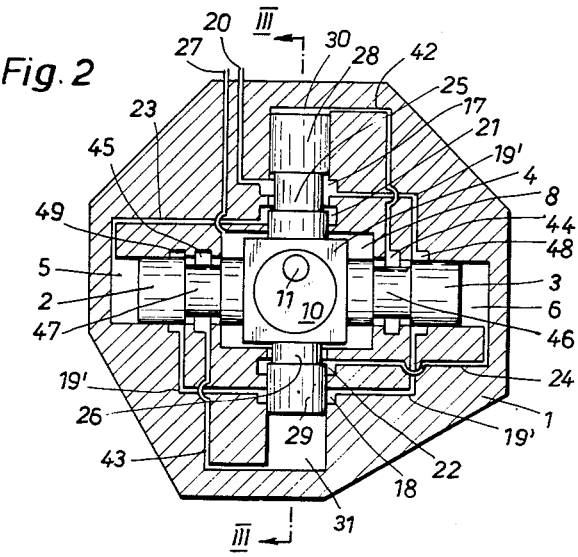
FIGURE 2 is an oscillating drive system of a similar type but provided with four cylinders for driving a mower.
Figure 3:
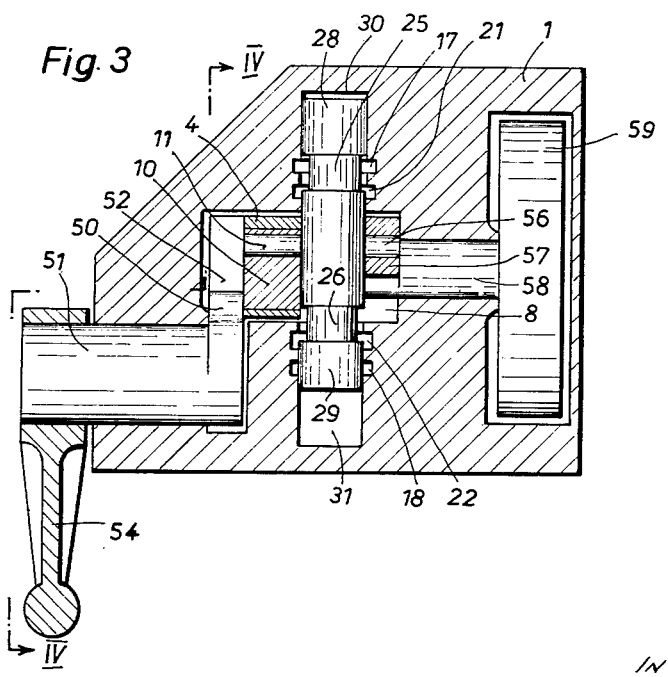
FIGURE 3 shows a section essentially on the line III—III of FIGURE 2.
Figure 4:
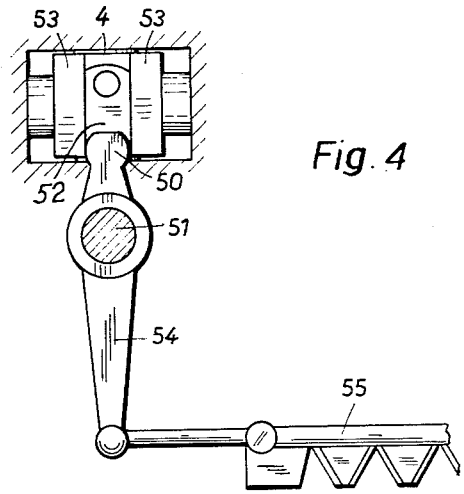
FIGURE 4 shows a section on the line IV—IV of FIGURE 3.

In the embodiment shown in FIGURES 2 to 4 like reference numbers designate like parts as used in the oscillating drive according to FIGURE 1. A description of the construction of the oscillating drive according to FIGURE 2, to the extent that it corresponds to the embodiment of FIGURE 1, may thus be omitted. Accordingly, the subsequent explanation is directed principally to the different or additional features of this modified construction. In this case a four cylinder oscillating drive is involved, comprising two pairs of opposite cylinders in which the slides 12, 13 of the oscillating drive according to FIGURE 1 are replaced each by a piston 28 and 29, respectively, which pistons operate in the cylinders 30 and 31, respectively. These two cylinders 30, 31 are connected each to an annular space 44 or 45 of the remaining two cylinders 6 or 5, by conduits 42, 43 which annular spaces are in turn connected through the annular spaces 46, 47 of the pistons 3 or 2 alternately with the central recess 8, or each with an additional annular space 48 and 49 of the cylinders 6 or 5. The two last-named annular spaces are connected to each other and to the pressure conduit 20, respectively, by ducts 19'.

As may be seen from FIGURES 3 and 4, a cam follower end 50 of a pivoting shaft 51 mounted in the housing 1 engages a cam 52 of the carrier 4. Cam 52 is formed by two webs 53 of the carrier 4, extending parallel to each other (see FIGURE 4). The terminal portion of the pivoting shaft 51 protrudes out of the housing 1 and carries a pivoting arm 54 which drives a reciprocating element, which in this case is shown as a cutter 55.

The two interconnected pistons 28, 29, which form an integral part in this type of construction, carry a driver pin 56 in addition to the eccentric shaft 11. Driver pin 56 forms an extension at the opposite side of the shaft 11 and enters into the forked end of a crank arm 57 of a pivoting shaft 58 mounted in the housing 1. At the opposite end of the pivoting shaft 58 a fly weight 59 is secured, which usually is disposed eccentrically with respect to the pivoting shaft 58, but which could also have the shape of a fly-wheel disc.

In the position of the oscillating drive shown the cylinder 5 communicates through the annular spaces 21, 25 and 17 with the pressure conduit 20, and the cylinder 6 communicates by means of the conduit 24, the annular spaces 22, 26 and also by means of the recess 8 with the return conduit 27. Hence, the carrier 4 with the pistons 2 and 3 will be displaced towards the right hand side in the drawing. The cylinder 30 then communicates by the intermediary of the annular spaces 44, 46 and 48, with the pressure conduit 20, so that this cylinder starts its operating stroke while the pressure medium leaves the cylinder 31 and passes through the annular spaces 45, 46 and also through the recess 8 into the return conduit. In this manner as clearly understandable from the description and drawings, the working cylinders of the oscillating drive carry out their pressure strokes in a sequence following the hand of a clock, the dead center positions of one pair of pistons coinciding with those of the cutter 55 (i.e. the reciprocally driven element), while the dead center positions of the second pair of pistons coincide with those of the fly weight 59. This weight influences the operation in the same advantageous manner as fly weight 16 show in the previously discussed oscillating drive of FIGURE 1.

Figure 5:
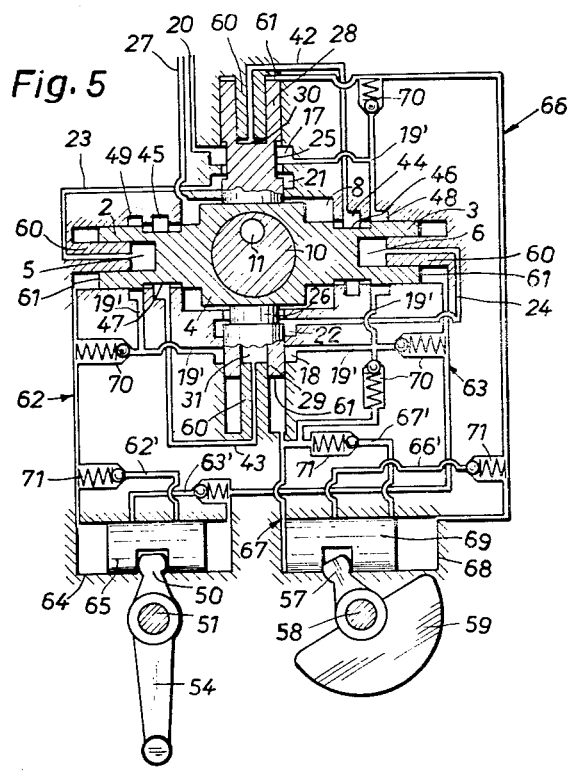
FIGURE 5 is a hydraulic oscillating drive of basically the same type of construction as shown in FIGURE 2, but which contrary to the previous embodiments, is hydraulically coupled to the element and with the fly weight.

The oscillating drive according to FIGURE 5 differs from the last-described oscillating drive principally in that one or the other pair of pistons is coupled to the driven element or the fly weight hydraulically, rather than mechanically, with a hydraulic linkage being shown. In this figure, I show like reference numbers to indicate parts having a corresponding operating component in the previously discussed embodiment, even where such new parts might not have the exact same physical configuration. Accordingly, the numerals 5, 30, 6 and 31 designate blind holes of the pistons 2, 28, 3 or 29, each of which are closed by a cylindrical bolt 60 of the housing 60 to act as an operating cylinder. They are supplied by conduits 23, 42, 24 or 43, as in the previously described embodiment. The annular end faces 61 of the pair of pistons 2 and 3, which surround the bolt 60, are each connected by hydraulic linkage 62, 63 with one end face of a piston 65 which is guided in a cylinder 64 and drives the cutter (not shown) by means of the pivoting lever 50, 54 pivotally mounted at 51. The annular end faces 61 of the pair of pistons 28, 29 in turn are each connected by an additional hydraulic linkage 66 and 67, respectively. One or the other operating surface of a piston 69 moving in cylinder 68, drives the fly-wheel mass 59, pivotally supported at 58, by means of a crank arm 57. By the intermediary of a compensating valve 70 each of the hydraulic linkages is connected to one of the conduits 19 and maintained under pressure. In addition each of the hydraulic linkages is associated with a replenishing conduit 62', 63', 66' and 67', which each open through a compensation valve 71 on the one end in the respective hydraulic linkage and on the other end in the cylinder 64 and 68, respectively, actuated by the particular linkage. The openings of the compensation ducts are in this case arranged so that they connect the homonymous hydraulic linkage with the second hydraulic linkage associated with the same cylinder at the end of the operating stroke thereof, when the piston moves beyond the corresponding dead center position. The leakage losses are then compensated and the dead center positions of the operating pistons 65, 69 are fixed.

The manner of operation of the last described oscillating drive conforms basically to the operation of the oscillating drive mechanism of previously described FIGURES 2 to 4, and it is believed the operation of the hydraulic linkages employed therein is clearly evident from the previous explanation and from the drawings. Naturally, the element moving to-and-fro and the fly weight travel with respect to each other with a phase displacement of ¼ period.

Figure 6:
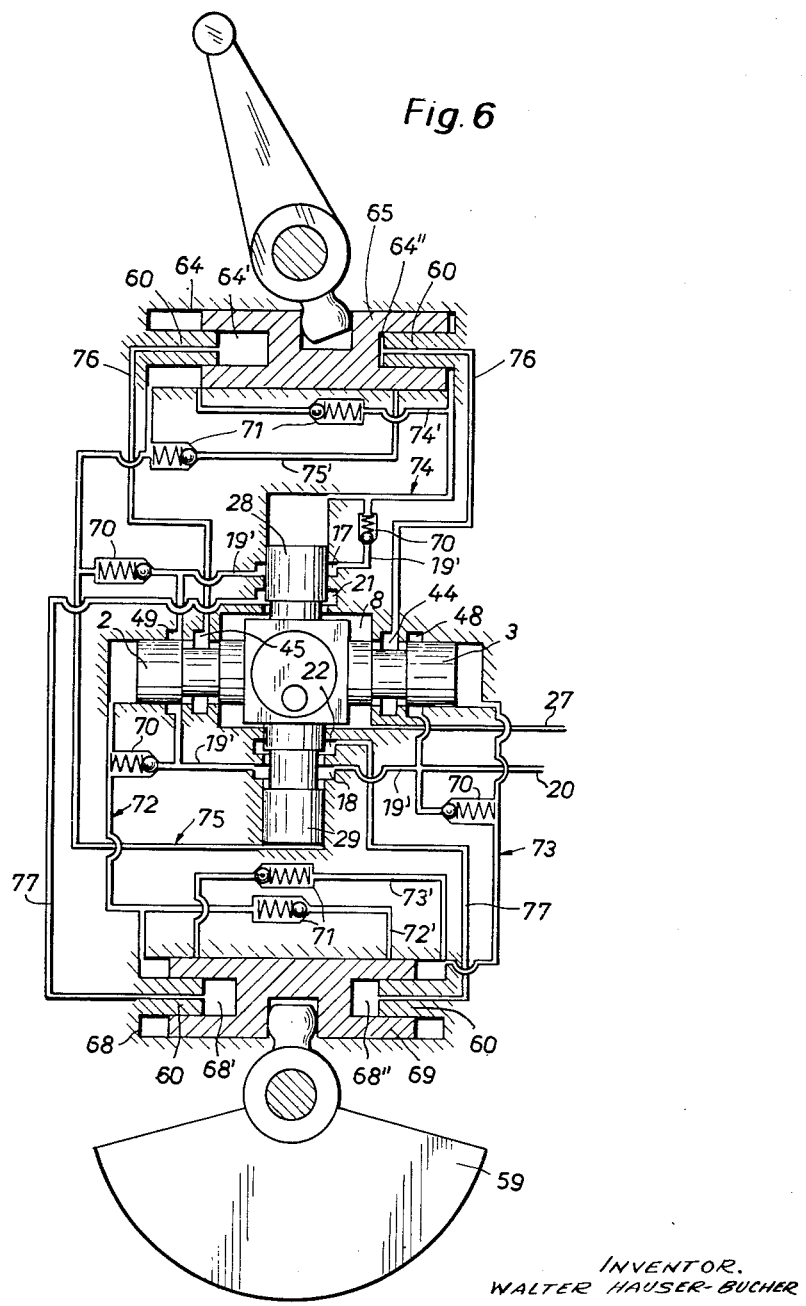
FIGURE 6 is a hydraulic oscillating drive, in which a structural unit as shown in FIGURE 2 coacts with hydraulic amplifiers.

In FIGURE 6, the designation of like parts, or of parts having the same function as those previously discussed, are designated by the same reference number. In contradistinction to the previously described modifications, the pairs of pistons 2, 3 and 28, 29, respectively, in this construction carry out only their partial function as control slides and they no longer actively participate on the drive of the working pistons 65 or 69 for the reciprocating element and the fly weight 59, respectively. With respect to their control motion, they are each driven by the associated operating piston by the intermediary of hydraulic linkages, namely the pair of pistons 2, 3 by the operating piston 69 from the hydraulic linkages 72 or 73, and the pair of pistons 28, 29 by the operating piston 65 from the hydraulic linkages 74 or 75. The said hydraulic linkages are connected each with one of the conduits 19' by means of replenishing valves 70. As in the previous embodiment, compensation valves 71 and also compensation conduits 72', 73' and 74', 75' are additionally provided which, in the manner already described, are released by the associated operating piston 69 or 65 when the corresponding dead center positions thereof are passed, in order to compensate for leakage losses in the hydraulic linkage of identical designation.

The annular grooves 44, 45 controlled by the pair of pistons 2, 3 are each connected to one of the operating spaces 64' and 64", respectively, of the working cylinder 64, which operating spaces are arranged in dead end bores of the piston 65 and closed by bolts. The connecting conduits extending from the said annular spaces to these operating spaces are designated by 76. In a similar manner the annular spaces 21 or 22 which are controlled by the pair of pistons 28, 29 are connected by conduits 77 to the operating spaces 68' or 68" of the working cylinder 68, which operating spaces are again disposed in blind ended holes of the piston and closed by means of bolts 60. In this manner the operating spaces of the working cylinder 64 and 68, respectively, are connected with the pressure conduit 20 or with the return conduit 27 depending on the position of the particular pair of pistons, whereby the two working pistons are reciprocated with respect to each other at the corresponding phase displacement. The pairs 2, 3 or 28, 29 of control pistons are maintained in motion by the hydraulic linkages. The manner of operation of this oscillating drive, moreover, is clearly evident from the description given and also from the drawings, so that further explanations are superfluous.

Finally it has to be stated that the eccentric drive used in all embodiments of the invention has to be considered as a preferred solution, though other suitable types of drives, for example a crank drive, will also enable a realization of the invention. Furthermore, it has to be pointed out that the eccentric drive itself may be modified, in which connection attention first has to be called to the fact that an eccentric used in the described manner basically could be replaced for example by a link rod.

I claim:
1. A drive system comprising:
  an operable element movable in a reciprocating path of movement between a first and second position;
  first means for driving said operable element in its reciprocating path of movement at a predetermined rate of reciprocatory motion, said first means including means for driving said operable element from its first to its second position, and from its second to its first position;
  a fly weight movable in a reciprocating path of movement between a first and second position; and
  second means connected between said operable element and said fly weight and responsive to movement of said operable element from its first toward its second position for driving said fly weight between its first and second position in its reciprocating path of movement at said predetermined rate of reciprocatory motion at a predetermined phase displacement relative to the reciprocatory motion of said operable element, said predetermined phase development being proportional to the difference in time at which said operable element and said fly weight occupy their first positions, respectively, movement of said fly weight toward its second position causing said first means to drive said operable element toward its first position.

2. The drive system of claim 1, wherein said predetermined phase displacement amounts to one quarter of a period, said period corresponding to the time required for said operable element to move from its first position to its second position and back to its first position.

3. The drive system of claim 1, and further including third means for guiding said operable element and said fly weight to move along respective axes, crosswise with respect to each other, said second means including a disc rotatably and eccentrically mounted on a shaft, said disc being movable with and rotatable relative to said operable element, said shaft being movable with said fly weight, whereby movement of said operable element toward its second position causes said disc to be rotated relative to said operable element to urge said shaft and fly weight from its first toward its second position.

4. The drive system of claim 1, wherein said first means for driving said operable element includes fourth means for driving said fly weight in its reciprocating path of movement.

5. The drive mechanism of claim 4, wherein said first means includes a hydraulic control system provided in said third means, said control system comprising a network of ducts utilizing fluid under pressure to drive said operable element and fly weight, said operable element being driven by displacement of fluid in said ducts caused by the movement of said fly weight, said fly weight being driven by displacement of fluid in said ducts caused by the movement of said operable element.

6. A drive system comprising:
  a first double-acting hydraulic piston movable in a reciprocating path of movement between a first and second position;
  a second double-acting hydraulic piston movable in a reciprocating path of movement between a first and second position;
  hydraulic control means connected to said first and second pistons for driving each of said pistons at a predetermined rate of reciprocatory motion, said control means including a system of ducts containing fluid under pressure and means for driving one but not the other of said first and second pistons in response to the other of said first and second pistons reaching a predetermined position;
  eccentric cam means connected between said first and second pistons for driving said other of said first and second pistons in its reciprocatory path of movement when said one of said first and second pistons is being driven by said hydraulic control means; and
  first and second masses movable in reciprocatory paths of movement, said first and second masses being hydraulically connected to said first and second pistons, respectively, for movement in response to movement of said first and second pistons.

7. A drive system comprising:
  a fly weight movable in a reciprocating path of movement in response to reciprocatory movement of a first slide connected thereto;
  an operable element movable in a reciprocating path of movement in response to reciprocatory movement of a second slide connected thereto;
  hydraulic control means connected to said first and second slides for driving each of said slides at a predetermined rate of reciprocatory motion, said hydraulic control means comprising a system of ducts containing fluid under pressure and slide control means for permitting fluid under pressure to drive one but not the other of said first and second slides in response to the other of said first and second slides reaching a predetermined position, said slide control means including
  first and second double-acting pistons hydraulically connected to said first and second slides, respectively, said first and second pistons being movable in first and second paths of reciprocating motion, respectively, in response to movement of their first and second slides, respectively, and
  cam means connected between said first and second pistons for driving the piston which is hydraulically connected to said other of said slides when the piston hydraulically connected to said one of said slides is being driven by fluid under pressure.

References Cited by the Examiner
UNITED STATES PATENTS 1,002,610    9/1911    Van Pelt _____ 74—36
2,844,040    7/1958    Bancroft _____ 74—580 X BROUGHTON G. DURHAM, *Primary Examiner.*

P. W. SULLIVAN, *Assistant Examiner.*